US007272928B2

(12) United States Patent
Ariga et al.

(10) Patent No.: US 7,272,928 B2
(45) Date of Patent: Sep. 25, 2007

(54) HYDRAULIC CIRCUIT OF CONSTRUCTION MACHINERY

(75) Inventors: Nobuei Ariga, Niihari-gun (JP); Genroku Sugiyama, Ryugasaki (JP); Hideaki Tanaka, Tsuchiura (JP); Tsukasa Toyooka, Higashiibaraki-gun (JP); Masaki Egashira, Niihari-gun (JP); Takatoshi Ooki, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 11/439,346

(22) Filed: May 24, 2006

(65) Prior Publication Data

US 2006/0207248 A1 Sep. 21, 2006

Related U.S. Application Data

(63) Continuation of application No. 10/257,631, filed as application No. PCT/JP02/01378 on Feb. 18, 2002, now Pat. No. 7,076,947.

(30) Foreign Application Priority Data

Feb. 19, 2001 (JP) ............................ 2001-042082

(51) Int. Cl.
*F16D 31/02* (2006.01)

(52) U.S. Cl. ........................................... 60/428; 60/452

(58) Field of Classification Search .................. 60/413, 60/414, 428, 452
See application file for complete search history.

(56) References Cited

U.S. PATENT DOCUMENTS

| | | | |
|---|---|---|---|
| 4,354,420 A | 10/1982 | Bianchetta | |
| 4,880,359 A | 11/1989 | Hoffmeister et al. | |
| 4,904,161 A | 2/1990 | Kamide et al. | |
| 5,245,828 A | 9/1993 | Nakamura | |
| 5,974,796 A | 11/1999 | Ishikawa et al. | |
| 6,276,133 B1 | 8/2001 | Yoshida et al. | |
| 7,076,947 B2 * | 7/2006 | Ariga et al. | 60/452 |

FOREIGN PATENT DOCUMENTS

| | | |
|---|---|---|
| JP | 53-110102 | 9/1978 |
| JP | 57-18061 | 1/1982 |
| JP | 59-085046 | 5/1984 |
| JP | 59-181283 | 12/1984 |
| JP | 05-126104 | 5/1993 |
| JP | 05-248414 | 9/1993 |

* cited by examiner

*Primary Examiner*—F. Daniel Lopez
(74) *Attorney, Agent, or Firm*—Crowell & Moring LLP

(57) ABSTRACT

To keep one of three hydraulic pumps unaffected by variations in torque of the remaining hydraulic pumps when the three hydraulic pumps are used, displacements of the first and second hydraulic pumps are controlled based on their own delivery pressures P1,P2 and a pressure P3' obtained by reducing through a reducing valve 14 a delivery pressure P3 from the third hydraulic pump, while a displacement of the third hydraulic pump 3 is controlled only by its own delivery pressure P3. The pressure oil delivered from the third hydraulic pump 3, therefore, remains unaffected by variations in delivery flow rates from the first and second hydraulic pumps 1,2, in other words, by variations in their torque consumptions, so that the third hydraulic pump is assured to provide a stable flow rate.

4 Claims, 13 Drawing Sheets

HYDRAULIC CIRCUIT OF CONSTRUCTION MACHINERY

CROSS-REFERENCE TO RELATED APPLICATIONS

This application is a continuation of U.S. application Ser. No. 10/257,631, filed Jun. 19, 2003 now U.S Pat. No. 7,076,947, which is a National Stage of PCT/JP02/01378, filed Feb. 18, 2002, which claims priority to Japanese Application No. 2001-042082, filed Feb. 19, 2001.

TECHNICAL FIELD

This invention relates to a hydraulic circuit suited for arrangement in a construction machine such as a hydraulic excavator and having at least three hydraulic pumps drivable by an engine, especially to a hydraulic circuit capable of controlling displacements of the respective hydraulic pumps such that a torque consumed as a result of driving of the individual hydraulic pumps does not exceed output power force from the engine, and also to a construction machine equipped with the hydraulic circuit.

BACKGROUND ART

As a conventional technique of this kind, the invention disclosed in JP-A-53110102 is known, for example. According to this invention, there are arranged a plurality of variable displacement hydraulic pumps drivable by a single engine, pressure sensors for detecting delivery pressures from the individual hydraulic pumps, pump displacement controllers for controlling displacements of the individual hydraulic pumps, and a computing circuit for being inputted with signals from the individual pressure sensors, performing a predetermined computation and then outputting signals, which correspond to the results of the computation, to the pump displacement controllers. The computing circuit is designed such that the signals from the individual pressure sensors are added, a voltage value equivalent to the sum of outputs predetermined for the individual hydraulic pumps is divided by the added value, and the results of the division is outputted to the pump displacement controller via a limiter circuit.

According to the conventional technique constructed as described above, the output signal to the pump displacement controller is controlled based on signals from the respective pressure sensors such that the total of input torques to the individual hydraulic pumps does not exceed output force power which the engine can output. According to this conventional technique, the sum of input torques to the hydraulic pumps is limited so that, even when any one or more of the plural hydraulic pumps becomes or become higher in delivery pressure, the sum of the input torques to the hydraulic pumps does not exceed the output force power which the engine can output. This conventional technique, therefore, makes it possible to avoid an engine stall and also to use power of the engine rather effectively.

As another conventional technique, the invention disclosed in JP-A-05126104 is also known. This publication discloses a hydraulic circuit for a construction machine, which is equipped with two variable displacement hydraulic pumps and one fixed displacement hydraulic pump and feeds pressure oil from the fixed displacement hydraulic pump to a revolving hydraulic motor. A delivery pressure from the fixed displacement hydraulic pump is guided to regulators for the two variable displacement hydraulic pumps through a restrictor.

The hydraulic circuit disclosed as another conventional technique as mentioned above is designed such that, when the delivery pressure from the fixed displacement hydraulic pump increases, the regulators for the two variable displacement hydraulic pumps operate to reduce the delivery rates from the two variable displacement hydraulic pumps. Owing to this design, the sum of input torques to the individual hydraulic pumps does not exceed force power which an engine can output, so that the engine is protected from an overload.

In the above-described conventional art disclosed in JP-A-53110102, the delivery rates of the plural hydraulic pumps are all controlled evenly so that pressure oil cannot be fed preferentially to any particular actuator even when its flow rate is desired to remain unchanged. In a hydraulic excavator as an illustrative construction machine, a revolving load pressure during revolving drive becomes much higher than load pressures to hydraulic cylinders which drive front members such as a boom, an arm and a bucket. Upon combined operation of one or more members and a revolving hydraulic actuator, it is desired to feed pressure oil preferentially to the revolving hydraulic motor rather than the hydraulic cylinders for the front members. This is particularly so during initial operation of the revolving drive. According to this conventional technique, however, all the hydraulic pumps are designed to be controlled evenly, so that during such combined operation, the feed of pressure oil to the revolving hydraulic motor becomes insufficient and the revolving speed becomes slower. When the load pressure on the hydraulic cylinder for driving one of the front members changes during combined operation of the front members and the revolving hydraulic motor, the flow rate of pressure oil to be fed to the revolving hydraulic motor varies so that the revolving speed changes. During operation of a hydraulic excavator, variations especially in revolving speed make its operator feel extreme unpleasant. As appreciated from the foregoing, no consideration is made to any particular actuator in this conventional technique, and therefore, a problem exists especially in operability.

In the other conventional technique disclosed in JP-A-05126104, on the other hand, the fixed displacement hydraulic pump is used as a source of pressure oil to the revolving motor. During combined operation of the revolving hydraulic motor and another actuator, variations in the load on the actuator hence does not affect the revolving speed. To prevent the sum of input torques to the individual hydraulic pumps from exceeding the output force power which the engine can output, however, the conventional technique is designed to decrease the input torques to the remaining, two variable displacement hydraulic pumps. When the revolving load becomes greater during revolving drive of a hydraulic excavator, the delivery pressure from the fixed displacement hydraulic pump becomes extremely high, and the delivery rates from the remaining, two variable displacement hydraulic pumps are substantially decreased. When revolving drive is performed during operation of a boom, for example, the flow rate of pressure oil to be fed to the hydraulic cylinder for the boom extremely decreases, leading to a sudden slowdown in the operation speed of the boom. As appreciated from the foregoing, the other conventional technique also involves an unsolved problem especially in operability.

The present invention has been completed in view of the above-described problems of the respective conventional techniques. The present invention, therefore, has as a first object the provision of a hydraulic circuit for a construction machine, which uses three variable displacement hydraulic pumps and makes it possible for one of these hydraulic pumps to feed pressure oil at a stable flow rate to a particular actuator without being affected by torques consumed by the remaining two hydraulic pumps and hence, to smoothly perform driving of the particular actuator.

Further, the present invention has as a second object the provision of a hydraulic circuit for a construction machine, which, even when a load on a particular actuator fed with pressure oil from a third hydraulic pump increases, delivery rates of a first and second hydraulic pumps are not extremely decreased to prevent actuators other than the particular actuator from undergoing an excessive drop in speed and hence, to assure good operability.

DISCLOSURE OF THE INVENTION

To achieve the above-described objects, the present invention, in a first aspect thereof, provides a hydraulic circuit having an engine, a first hydraulic pump of a variable displacement type, second hydraulic pump of the variable displacement type and third hydraulic pump, all of which are drivable by the engine, capacity control means for controlling displacements of the first hydraulic pump and second hydraulic pump, plural actuators drivable by hydraulic pressures from the first, second and third hydraulic pumps, and plural directional control valves for controlling flows of pressure oil to be fed to the actuators, wherein the third hydraulic pump is a hydraulic pump of the variable displacement type, the hydraulic circuit is provided with capacity control means for the third hydraulic pump to control a displacement of the third hydraulic pump and also with first, second and third state quantity detection means for detecting quantities of states associated with respective torque consumptions by the first, second and third hydraulic pumps, the capacity control means for the first and second hydraulic pumps controls displacements of the first and second hydraulic pumps on a basis of the quantities of states detected by the first, second and third state quantity detection means, and the capacity control means for the third hydraulic pump controls a displacement of the third hydraulic pump on a basis of the quantity of state detected by the third state quantity detection means.

According to the first aspect of the present invention constructed as described above, the displacement of the third hydraulic pump is controlled only by a quantity of state associated with its own torque consumption, and remains unaffected by torques consumed by the remaining hydraulic pumps. To an actuator which is fed with pressure oil from the third hydraulic pump, the pressure fluid is fed at a stable flow rate so that its driving can be smoothly performed.

The present invention, in a second aspect thereof, features that in its first aspect, the quantities of states associated with the torque consumptions are delivery pressures from the respective hydraulic pumps.

The present invention, in a third aspect thereof, features that in its second aspect as a premise, the first state quantity detection means comprises a first guide line for guiding a delivery pressure from the first hydraulic pump to the capacity control means for the first and second hydraulic pumps, the second state quantity detection means comprises a second guide line for guiding a delivery pressure of the second hydraulic pump to the capacity control means for the first and second hydraulic pumps, the third state quantity detection means comprises a third guide line for guiding a delivery pressure from the third hydraulic pump to the capacity control means for the first and second hydraulic pumps and a fourth guide line for guiding the delivery pressure from the third hydraulic pump to the capacity control means for the third hydraulic pump.

The present invention, in a forth aspect thereof, features that limiting means for applying a predetermined limit to a delivery pressure signal from the third hydraulic pump is arranged on the third guide line. Owing to the arrangement of the limiting means, even when a load on the actuator fed with pressure oil from the third hydraulic pump increases, at least predetermined flow rates can be secured as delivery flow rates from the first and second hydraulic pumps without extremely decreasing the displacements of the first and second hydraulic pumps. It is, therefore, possible to avoid an excessive drop in the speed of each actuator and to assure good operability.

The present invention, in a fifth aspect thereof, features that in its fourth aspect, the limiting means is a reducing valve for limiting the delivery pressure signal to a pressure not higher than a predetermined setting pressure.

The present invention, in a sixth aspect thereof, features that in its second aspect, the hydraulic circuit is provided further with a pilot hydraulic pump, a first proportional solenoid valve arranged on a line, through which the capacity control means for the first and second hydraulic pumps are connected with each other, to control a delivery pressure from the pilot hydraulic pump, a second proportional solenoid valve arranged on a line, through which the pilot hydraulic pump and the capacity control means for the third hydraulic pump are connected with each other, to control the delivery pressure from the pilot hydraulic pump, and a controller for being inputted with signals from the first, second and third state quantity detection means to compute and output drive signals to the first and second proportional solenoid valves; and the capacity control means for the first and second hydraulic pumps is operated by a pilot pressure reduced by the first proportional solenoid valve, and the capacity control means for the third hydraulic pump is operated by a pilot pressure reduced by the second proportional solenoid valve.

The present invention, in a seventh aspect thereof, features that in its sixth aspect, when a detection signal from the third state quantity detection means is greater than a predetermined value upon computation of the drive signal to the first proportional solenoid valve, the controller calculates the torque consumption by the third hydraulic pump as a value greater than a maximum input torque allotted beforehand to the third hydraulic pressure, subtracts the value, which has been calculated as the torque consumption by the third hydraulic pump, from torque consumptions by the first and second hydraulic pumps as calculated based on the detection signals from the first and second state quantity detection means, and based on results of the subtraction, outputs a drive signal to the first proportional solenoid valve.

The present invention, in an eighth aspect thereof, features that a hydraulic circuit according to any one of the first to eighth aspect of the present invention is used to drive at least one working element in a construction machine.

The present invention, in a ninth aspect thereof, features that in its eighth aspect, the construction machine further comprises instruction means for allowing an operator to give instructions to the working element, and based on an instruction signal from the instruction means, the controller computes and outputs a drive signal to the first and second proportional solenoid valves.

The present invention, in a tenth aspect thereof, features that in its ninth aspect, the instruction signal is a drive instructing signal for a room air conditioner for an operator's cab arranged on the construction machine.

The present invention, in an eleventh aspect thereof, features that in its eight aspect, the construction machine is further provided with a fourth state quantity detection means for detecting a quantity of state associated with operation of the construction machine, and based on a signal from the fourth state quantity detection means, the controller computes and outputs a drive signal to the first and second proportional solenoid valve.

The present invention, in a twelfth aspect thereof, features that in its eleventh aspect, the construction machine is a hydraulic excavator provided with front members comprising a boom, an arm and an attachment, and the fourth state quantity detection means is attitude detection means for detecting attitudes of the front members.

The present invention, in a thirteenth aspect thereof, features that the fourth state quantity detection means is a coolant temperature sensor for detecting a coolant temperature of the engine.

The present invention, in a fourteenth aspect thereof, features that in any one of its eighth to thirteenth aspect, the construction machine is a revolving hydraulic excavator, and the third hydraulic pump feeds pressure oil to at least a revolving actuator.

In the embodiments to be described subsequently herein, the displacement controlling means for the first and second hydraulic pumps corresponds to a regulator 6, the capacity control means for the third hydraulic pump to a regulator 7, the limiting means to a reducing valve 14, the first guide line to a line 16, the second guide line to a line 17, the third and fourth guide lines to a line 18, the fourth guide line to a line 19, the third guide line to a line 20, the first and second guide lines to a line 27, the first state quantity detection means to a pressure sensor 63, the second state quantity detection means to a pressure sensor 64, the third state quantity detection means to a pressure sensor 65, the fourth state quantity detection means to a coolant temperature sensor 66, the instruction means to a drive switch 67 for an air conditioner, and the fourth state detection means to a boom angle sensor 70, arm angle sensor 71 and bucket angle sensor 72, respectively.

BEST MODES FOR CARRYING OUR THE INVENTION

The embodiments of the present invention will hereinafter be described based on the drawings.

FIRST EMBODIMENT

Figure 1:
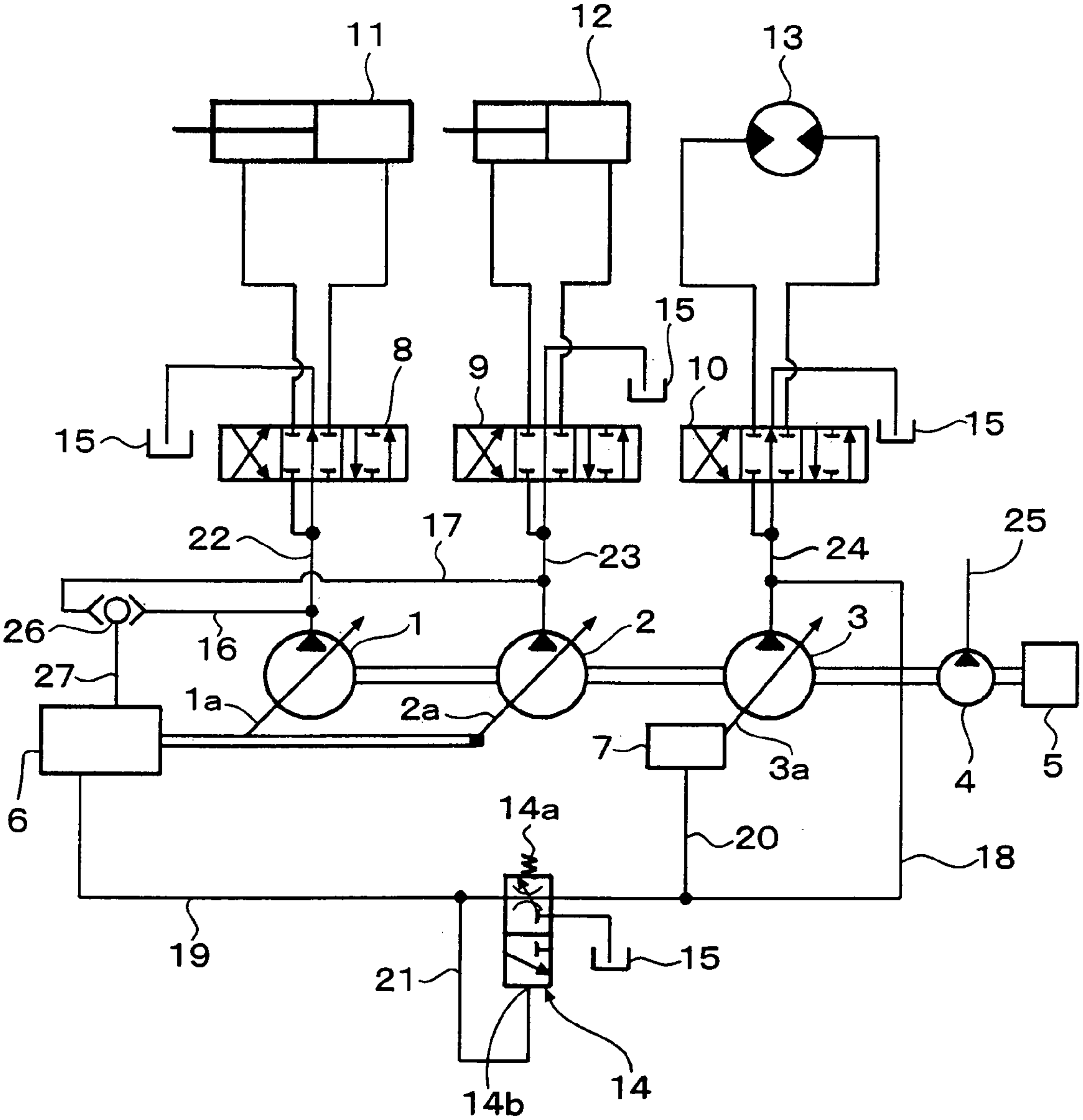
FIG. 1 is a hydraulic circuit diagram of a first embodiment according to the present invention.
Figure 2:
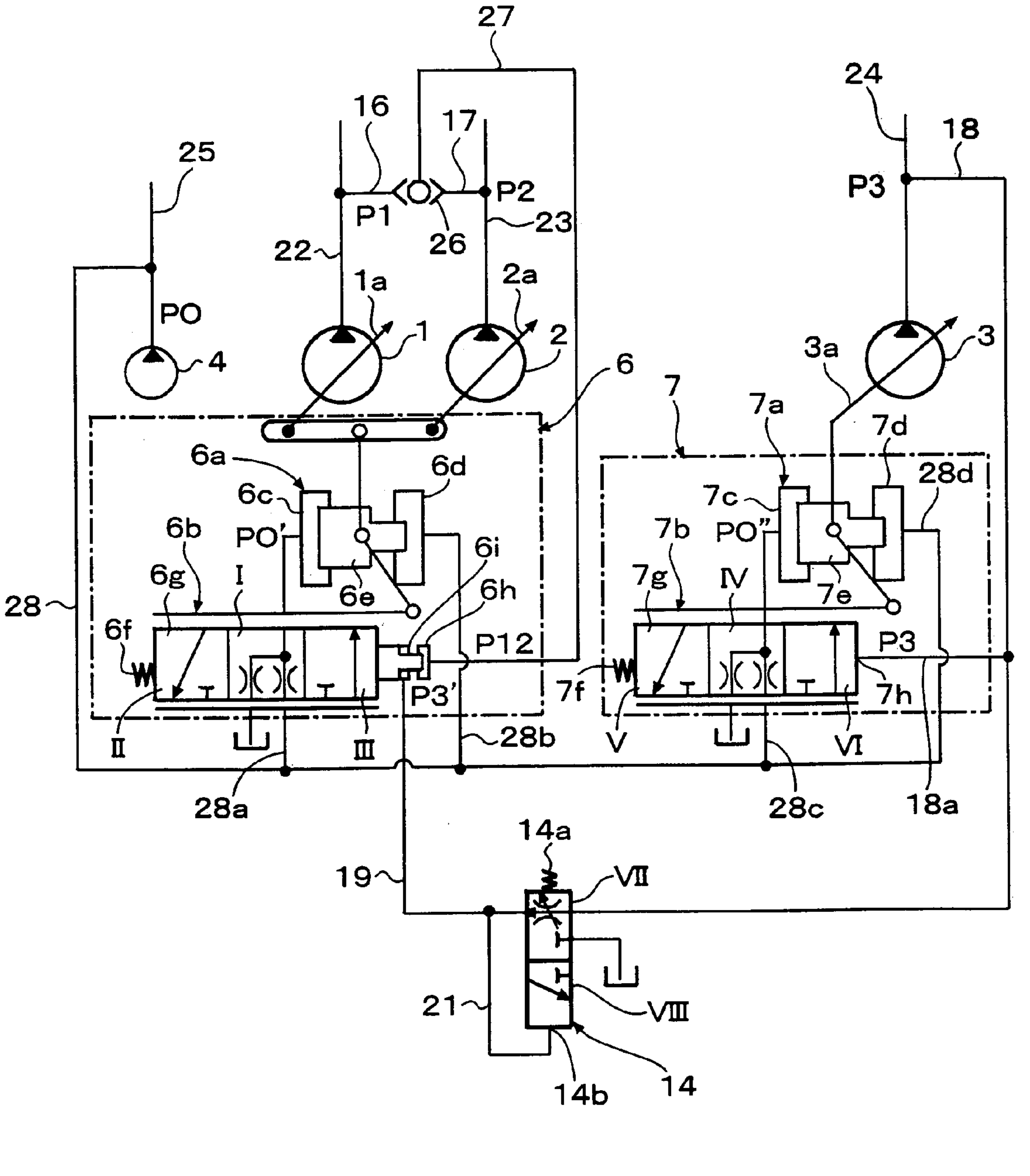
FIG. 2 is a fragmentary hydraulic circuit diagram of the first embodiment according to the present invention.
Figure 3:
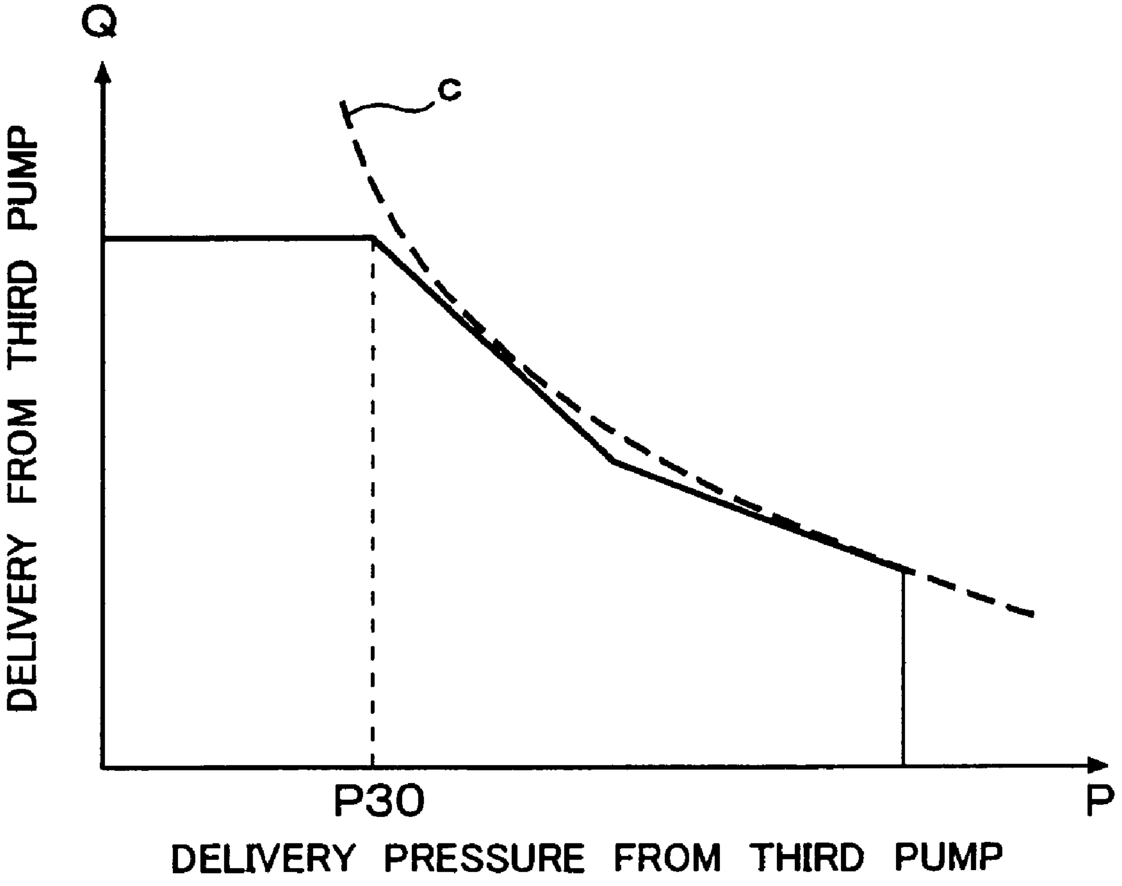
FIG. 3 is a diagram illustrating flow rate characteristics of a third hydraulic pump in the first embodiment of the present invention.
Figure 4:
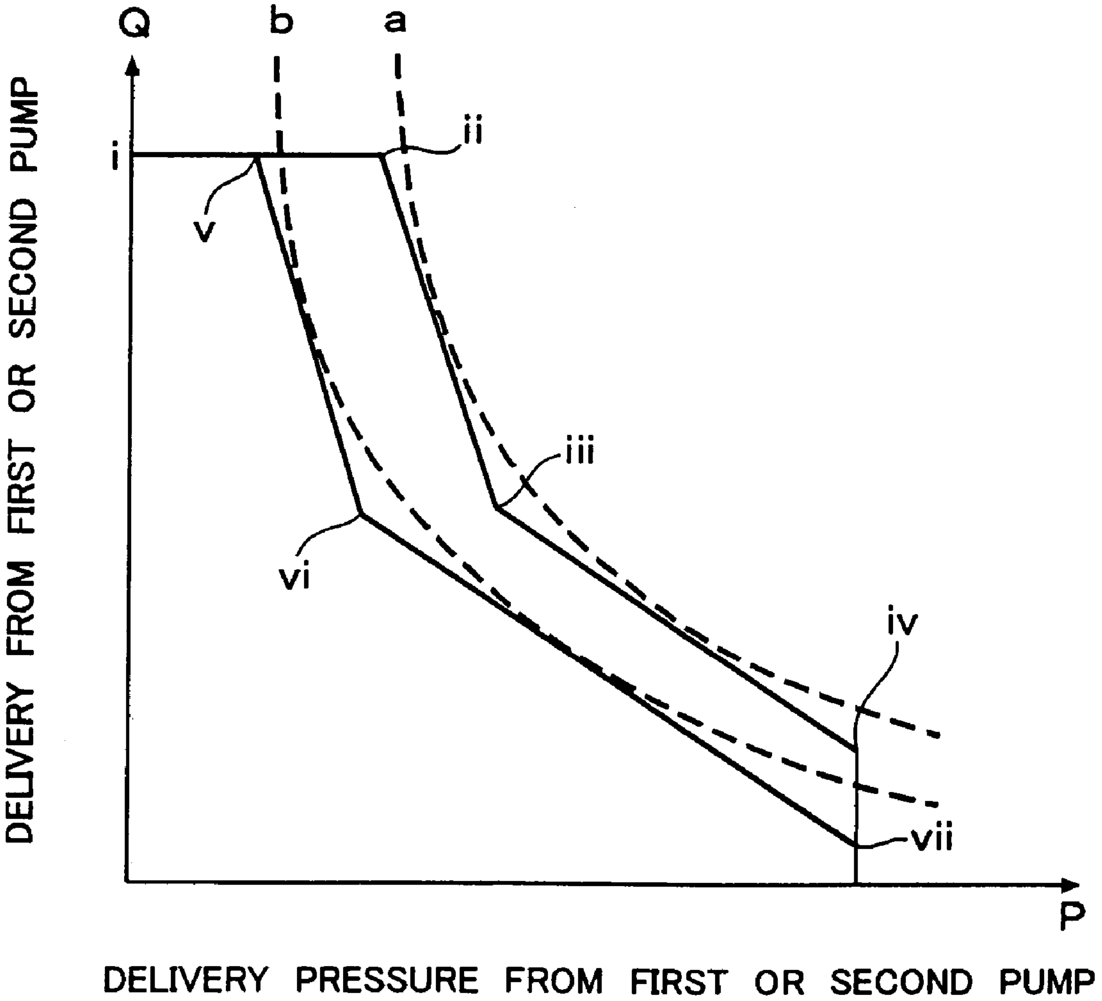
FIG. 4 is a diagram illustrating flow rate characteristics of a first and second hydraulic pumps in the first embodiment of the present invention.
Figure 5:
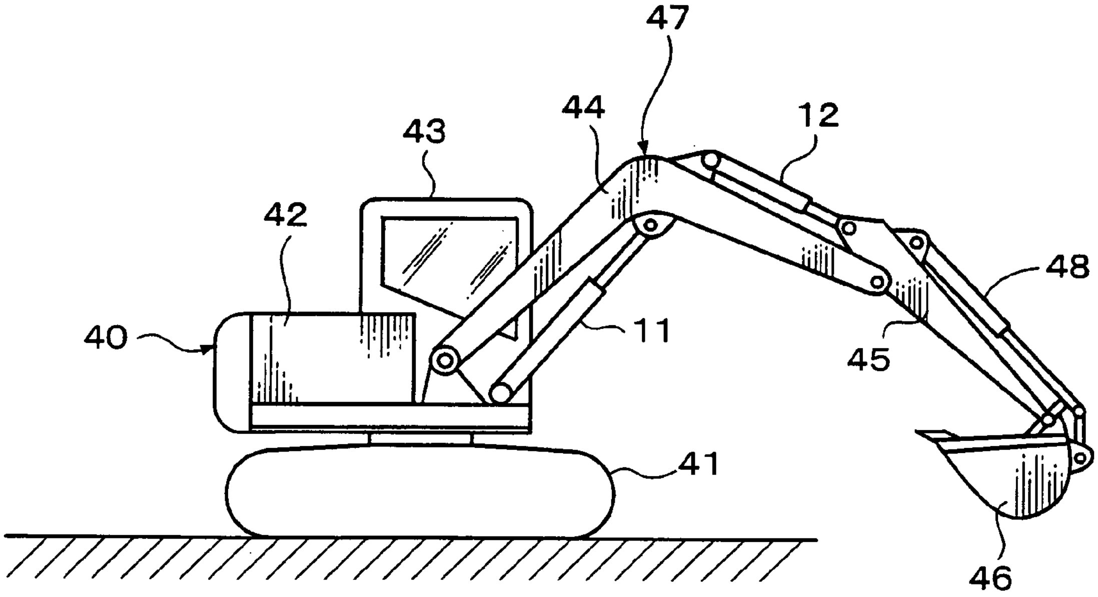
FIG. 5 is a view showing an appearance of a hydraulic excavator as a construction machine to which the present invention is applied.

In this embodiment, the present invention is applied to a hydraulic circuit of a hydraulic excavator as a construction machine. FIG. 1 through FIG. 5 illustrate the first embodiment, in which FIG. 1 is an entire hydraulic circuit diagram, FIG. 2 is a fragmentary hydraulic circuit diagram, FIG. 3 is a characteristic diagram of delivery flow rate of a third hydraulic pump, FIG. 4 is a characteristic diagram of delivery flow rates of a first and second hydraulic pumps, and FIG. 5 is an appearance view of the hydraulic excavator.

As illustrated in FIG. 5, the hydraulic excavator as the construction machine to which the present invention is applied is equipped with a travel base 41 which can travel by an unillustrated travel motor, a revolving superstructure 40 having an operator's cab 43 and an engine room 42 and revolvable by a revolving hydraulic motor 13 depicted in FIG. 1, and front members 47 constructed of a boom 44, arm 45 and bucket 46 which can be pivoted by hydraulic cylinders 11,12,48, respectively. Incidentally, the boom 44 is connected to the revolving superstructure 40 via a pin and is arranged pivotally relative to the revolving superstructure 40.

FIG. 1 is the entire diagram of the hydraulic circuit for the boom cylinder 11, arm cylinder 12 and revolving motor 13. It is to be noted that the bucket cylinder 48, a travel motor system and an operating pilot system are omitted. As depicted in FIG. 1, the hydraulic circuit according to the first embodiment has a first, second and third hydraulic pumps 1,2,3 of the variable displacement type and a pilot pump 4 of the fixed displacement type, all of which are driven by an engine 5.

Pressure oils delivered from the first, second and third hydraulic pumps 1,2,3 into their corresponding main lines 22,23,24 are controlled in flow by a directional control valves 8,9,10, and are guided to the boom cylinder 11, arm cylinder 12 and revolving motor 13, respectively. The first, second and third hydraulic motors 1,2,3 are swash plate pumps the delivery flow rate per rotation (capacities) of which are adjustable by changing the swash angles (displacements) of displacement varying mechanisms (hereinafter typified by swash plates) 1*a*,2*a*,3*a*. The swash angles of the swash plates 1*a*,2*a* are controlled by a regulator 6 as the capacity control means for the first and second hydraulic pumps 1,2, while the swash angle of the swash plate 3*a* is controlled by a regulator 7 as the capacity control means for the third hydraulic pump.

Details of an essential part of the hydraulic circuit, said essential part including the regulators 6,7, will be described based on FIG. 2. It is to be noted that in FIG. 2, a system for driving each actuator at a speed corresponding to a stroke of an unillustrated corresponding control lever, that is, a flow control system for increasing or decreasing a swash angle in correspondence to a flow rate required for a hydraulic pump to drive each actuator at a speed corresponding to a control signal is omitted.

The regulators 6,7 have a function to limit input torques to the hydraulic pumps, and are composed of servo cylinders 6*a*,7*a* and swash angle control 6*b*,7*b*. The servo cylinders 6*a*,7*a* are provided with differential pistons 6*e*,7*e* which are driven depending upon differences in pressure-receiving areas. Large-diameter-side pressure receiving compartments 6*c*,7*c* of the differential pistons 6*e*,7*e* are connected to pilot lines 28*a*,28*c* and a reservoir 15 via the swash angle control valves 6*b*,7*b*, while small-diameter-side pressure receiving compartments 6*d*,7*d* are connected to pilot lines 28*b*,28*d* so that a pilot pressure P0 fed via pilot lines 25,28 applies directly. When the large-diameter-side pressure receiving compartments 6*c*,7*c* are brought into communication with the pilot lines 28*a*,28*c*, the differential pistons 6*e*,7*e* are driven rightward as viewed in the drawing owing to the differences in pressure-receiving areas. When the large-diameter-side pressure receiving compartments 6*c*,7*c* are brought into communication with the reservoir 15, the differential pistons 6*e*,7*e* are driven leftward as viewed in the drawing owing to the differences in pressure-receiving areas. When the differential pistons 6*e*,7*e* move rightward as viewed in the drawing, the swash angles of the swash plates 1*a*,2*a*,3*a*, that is, the pump swash angles decrease so that the delivery rates of the hydraulic pumps 1,2,3 decrease. When the differential pistons 6*e*,7*e* move leftward as viewed in the drawing, on the other hand, the swash angles of the swash plates 1*a*,2*a*,3*a*, that is, the pump swash angles increase so that the delivery rates of the hydraulic pumps 1,2,3 increase.

The swash angle control valves 6*b*,7*b* are valves for limiting input torques, and are composed of spools 6*g*,7*g*, springs 6*f*,7*f* and control drive portions 6*h*,6*i*,7*h*. Pressure oil (delivery pressure P1) delivered from the first hydraulic pump 1 and pressure oil (delivery pressure P2) delivered from the second hydraulic pump 2 are guided to a shuttle valve 26 through the line 16 and line 17 branched from the main lines 22,23, respectively. The pressure oil (pressure P2) on a higher pressure side selected by the shuttle valve 26 is guided via the line 27 to the control drive portion 6*h* of the swash angle control valve 6*b* for the first and second hydraulic pumps 1,2. Pressure oil (delivery pressure P3) delivered from the third hydraulic pump 3, on the other hand, is reduced in pressure (pressure P3') by the reducing valve 14 which is arranged, as limiting means to be mentioned subsequently herein, on the line 18 branched from the main line 24, and is guided to the other control drive portion 6*i* via the line 19. To the control drive portion 7*h* of the swash angle control valve 7*b* for the third hydraulic pump, on the other hand, the delivery pressure P3 from the third hydraulic pump 3 is directly guided via the line 18 and the line 18*a* branched from the line 18. The valve positions of the individual swash angle control valves 6*b*,7*b* are controlled in accordance with pressing forces by the springs 6*f*,7*f* and hydraulic pressures to the control drive portions 6*h*,6*i*,7*h*.

The reducing valve 14 has a spring 14*a* and a pressure-receiving portion 14*b* to which a delivery pressure is fed back via the line 19 and a line 21. When the delivery pressure P3 from the third hydraulic pump 3 becomes equal to or higher than a predetermined pressure value set by the spring 14*a*, the reducing valve 14 increases its degree of restriction. As a result, the delivery pressure P3 of the third hydraulic pump 3 is reduced such that the pressure P3' to be guided to the control drive portion 6*i* of the swash angle control valve 6*b* does not become higher than the predetermined pressure value. In this first embodiment, the spring 14*a* is set at a maximum pressure P30 at which the delivery rate control of the third hydraulic pump 3, said delivery rate control being illustrated in FIG. 3, is not practiced. Designated at numeral 15 is the pressure oil reservoir.

The delivery pressure P1 of the first hydraulic pump 1 corresponds to the first quantity of state, and the line 16 and line 27 constitute the first state quantity detection means and the first guide line. Further, the delivery pressure P2 of the second hydraulic pump 2 corresponds to the second quantity of state, and the line 17 and line 27 constitute the second state quantity detection means and the second guide line. In addition, the delivery pressure 3 of the third hydraulic pump corresponds to the third quantity of state, the line 18 and line 19 constitute the third state quantity detection means and the third guide line, and the line 18 and line 18*a* constitute the third state quantity detection means and the fourth guide line.

In the hydraulic circuit according to the first embodiment constructed as described above for the construction machine, operation of the boom cylinder 11 increases the swash angle of the regulator 6 by an unillustrated flow rate control system in accordance with a flow rate required for the boom cylinder 11. By this increase in delivery flow rate and a load pressure on the boom cylinder 11, the delivery pressure P1 from the first hydraulic pump 1 becomes higher so that a pressure P12 on the control drive portion 6*h* of the swash angle control valve 6*b* rises, leading to an increase in leftward pressing force to the spool 6*g* as viewed in the drawing. When this leftward pressing force to the spool 6*g* exceeds the rightward pressing force by the spring 6*f*, the spool 6*g* moves leftward so that its valve position moves toward III to bring the large-diameter-side pressure receiving compartment 6*c* of the servo cylinder 6*a* into communication with the pilot line 28*a*. As mentioned above, this communication of the large-diameter-side pressure receiving compartment 6*c* of the servo cylinder 6*a* with the pilot line 28*a*, owing to the difference in pressure receiving area between the respective pressure receiving compartments 6*c*,6*d* in the servo cylinder 6*a*, causes the differential piston 6*e* to move rightward as viewed in FIG. 2 so that the swash angles of the swash plates 1*a*,2*a* decrease. As the revolving motor 13 is not in operation, on the other hand, the delivery pressure P3 of the third hydraulic pump 3 remains at a low pressure level, and the pressure P3' applied to the other control drive portion 6*i* of the swash angle control valve 6*b* also remains at an extremely low level.

When the revolving motor 13 is not in operation as described above, the swash angles of the first hydraulic pump 1 and second hydraulic pump 2 are controlled by the delivery pressure P1 or P2 of the first hydraulic pump 1 or the second hydraulic pump 2, and their delivery flow rates change along a flow rate characteristic curve I-ii-iii-iv shown in FIG. 4. Described specifically, when the delivery pressures P1,P2 from the first hydraulic pump 1 and second hydraulic pump 2 are relatively low pressures, the swash angles are large and the delivery flow rates becomes greater. As the delivery pressures P1,P2 become higher, however, the swash angles decrease to reduce the delivery flow rates, thereby controlling the swash angles such that torques consumed by the first hydraulic pump 1 and second hydraulic pump 2 do not exceed a maximum input torque a (curve a shown by a dashed line) allotted beforehand to them.

When operation of the revolving motor 13 is instructed under such a condition, the delivery flow rate from the third hydraulic pump 3 is increased by the unillustrated flow rate control system, and under substantially the same action as in the above-mentioned driving of the boom cylinder 11, the swash angle of the swash plate 3*a* of the hydraulic pump 3 decreases depending upon the delivery pressure P3 along the flow rate characteristic curve shown in FIG. 3. Namely, the swash angle is controlled within such a range that the torque consumed by the third hydraulic pump 3 does not exceed a maximum input torque c (curve c shown by a broken line) set beforehand therefor. Because the delivery pressures P1,P2 of the first hydraulic pump 1 and second hydraulic pump 2 are not reflected to the control by the regulator 7 for the third hydraulic pump 3 in this case, the feed flow rate from the third hydraulic pump 3 to the revolving motor 13 does not vary even when a load pressure, for example, on the boom cylinder 11 varies.

The delivery pressure P3 from the third hydraulic pump 3, on the other hand, is guided to the regulator 6 for the first and second hydraulic pumps 1,2 via the reducing valve 14. Described specifically, the delivery pressure P12 from the first and second hydraulic pumps 1,2 acts on the control drive portion 6*h* of the swash angle control valve 6*b*, and the pressure P3' obtained by reducing the delivery pressure P3 from the third hydraulic pump 3 is applied to the other control drive portion 6*i*. The swash angles of the first and second hydraulic pumps 1,2 are decreased to still smaller values by the regulator 6 than their swash angles when the revolving motor 13 is not driven. Depending upon the value of the pressure P3' applied from the reducing valve 14, the delivery rates of the first and second hydraulic pumps 1,2 are controlled to values in an area surrounded by flow rate characteristic lines i-ii-iii-iv-vii-vi-v shown in FIG. 4. As mentioned above, the spring 14*b* of the reducing valve 14 is set such that the pressure P3' to be transmitted to the swash angle control valve 6*b* becomes P30 or lower, and the characteristic lines v-vi-vii correspond to a torque b (the curve b shown by the broken line in FIG. 4) obtained by subtracting an input torque, which is applied to the third hydraulic pump 3 and is equivalent to the pressure P30, from the maximum input torque a to the first and second hydraulic pumps 1,2. As mentioned above, the pressure P30 is the pressure available when no control is performed on the delivery rate of the third hydraulic pump 3, and an input torque corresponding to the pressure P30 is of a value substantially equal to or slightly smaller than a maximum input torque c allotted to the third hydraulic pump 3. Even when the revolving load becomes greater and the delivery pressure P3 from the third hydraulic pump 3 increases, at least flow rates indicated by the flow rate characteristic lines i-v-vi-vii in FIG. 4 are, therefore, assured as delivery flow rates from the first and second hydraulic pumps 1,2. It is, accordingly, possible to avoid such a situation that the operation speeds of the boom cylinder 11 and arm cylinder 12 drop extremely.

According to the hydraulic circuit of the first embodiment for the construction machine, variations, if any, in the torque consumptions by the first and second hydraulic pumps 1,2 as a result of variations in the load on the boom cylinder 11 and the load on the arm cylinder 12 are not reflected to the control of the swash angle of the third hydraulic pump 3 so that pressure oil is fed at a stable flow rate to the revolving motor 13. Therefore, smooth revolving operation is assured. Even when the revolving load increases, the delivery flow rates from the first and second hydraulic pumps 1,2 are not decreased beyond necessity, thereby making it possible to avoid an extreme drop in the speed of each of the boom cylinder 11 and arm cylinder 12 and to assure good operability.

SECOND EMBODIMENT

Figure 6:
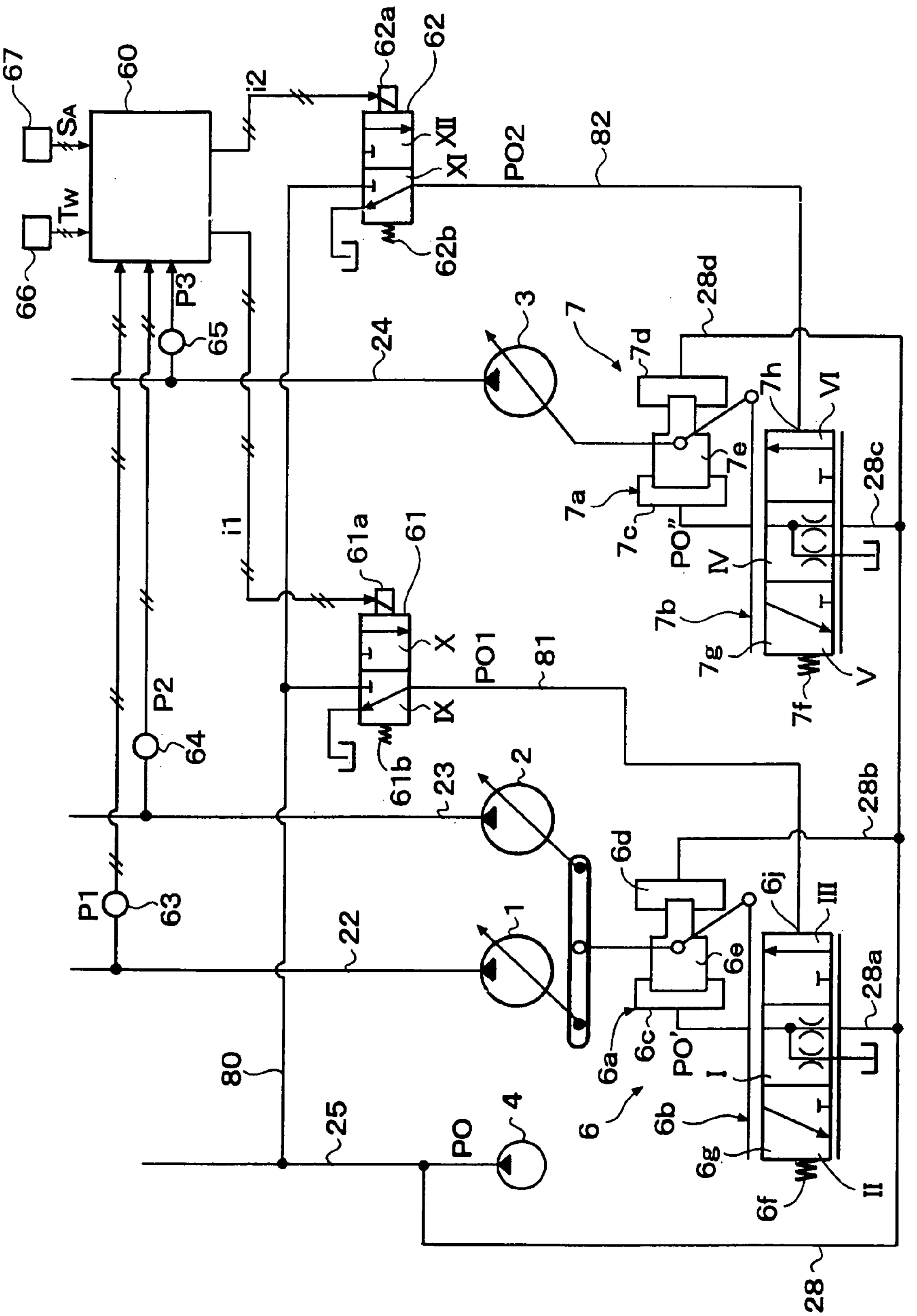
FIG. 6 is a fragmentary hydraulic circuit diagram of a second embodiment according to the present invention.
Figure 7:
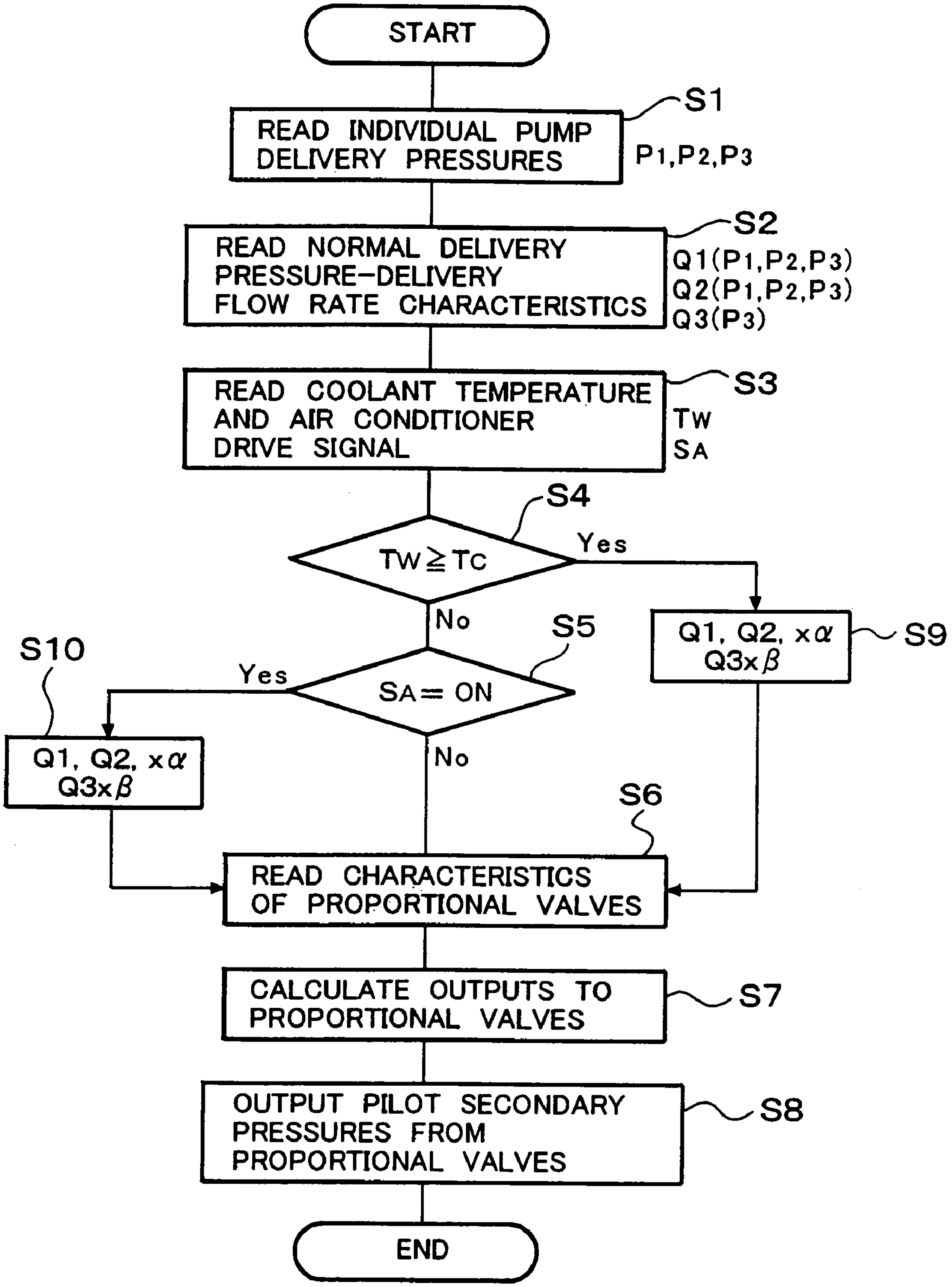
FIG. 7 is a flow chart illustrating a flow of processing by a controller in the second embodiment of the present invention.
Figure 8:
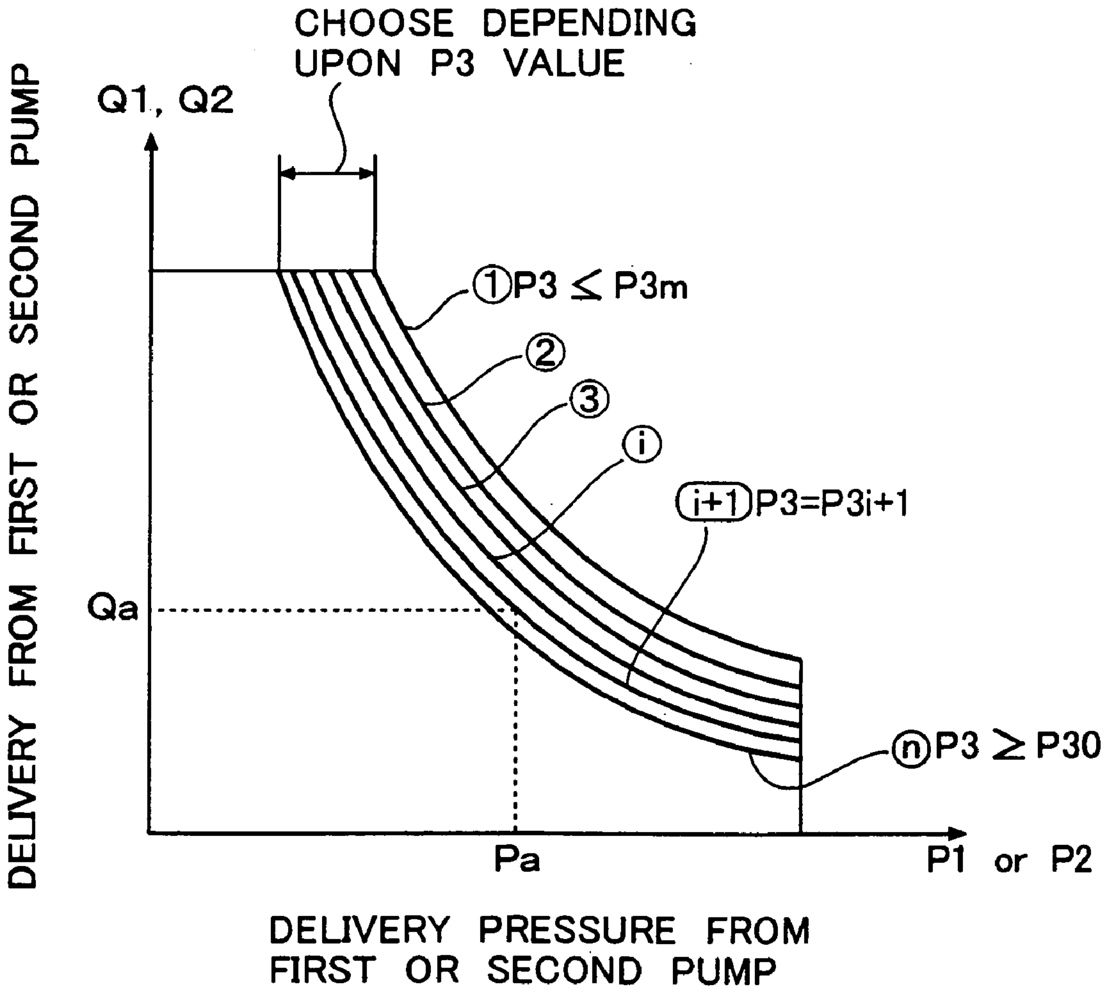
FIG. 8 is a diagram illustrating flow rate characteristics of a first and second hydraulic pumps in the second embodiment of the present invention.
Figure 9:
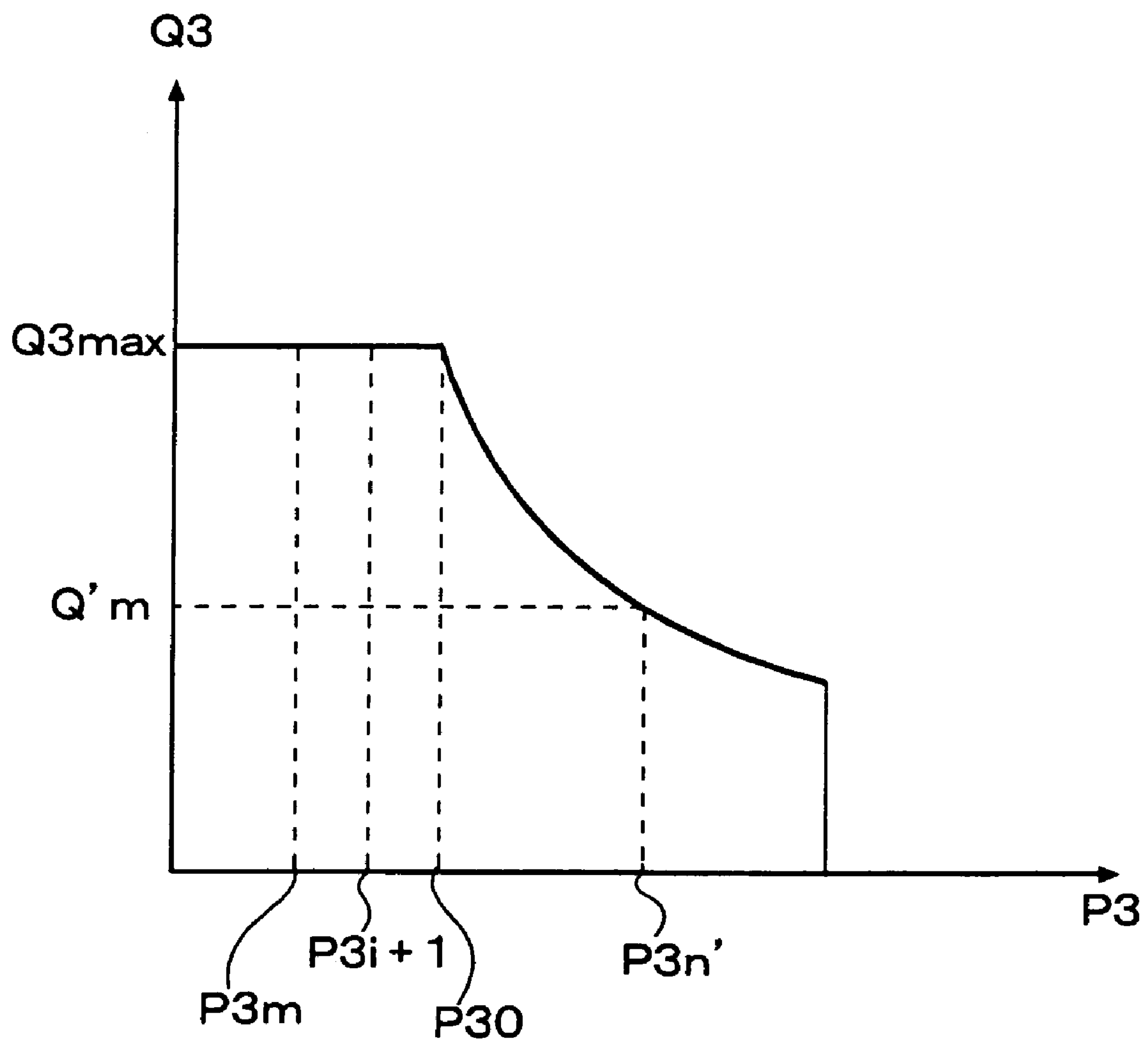
FIG. 9 is a diagram illustrating flow rate characteristics of a third hydraulic pump in the second embodiment of the present invention.

Referring next to FIG. 6 through FIG. 9, a description will be made about the second embodiment of the present invention. FIG. 6 is a fragmentary hydraulic circuit diagram in the second embodiment, FIG. 7 is a flow chart showing a flow of processing by a controller, FIG. 8 is a characteristic diagram of a delivery flow rates from a first and second hydraulic pumps, and FIG. 9 is a characteristic diagram of a flow rate from a third hydraulic pump. It is to be noted that those portions of the hydraulic circuit which are the same as the corresponding parts described above in connection with the first embodiment are shown by the same reference numerals and overlapping descriptions are omitted.

As shown in FIG. 6, this second embodiment is provided with a controller 60, which performs the below-mentioned computing processing based on signals inputted from pressure sensors 63,64,65 for detecting delivery pressures P1,P2, P3 of a first, second and third hydraulic pumps 1,2,3, a coolant temperature sensor 66 as the fourth state quantity detection means for detecting a coolant temperature of the engine 5, and a room air conditioner drive switch 67 as the instruction means in the operator's cab 43. On a line 80 branched from a delivery line 25 of a pilot pump 4, a first proportional solenoid valve 61 and a second proportional solenoid valve 62 are arranged to reduce a pilot primary pressure P0 such that via lines 81,82, reduced pilot secondary pressures P01,P02 are guided to control drive portions 6*j*,7*h* of swash angle control valves 6*b*,7*b* which constitute regulators 6,7, respectively. In the above-described first embodiment, the delivery pressures P1,P2,P3 from the respective hydraulic pumps 1,2,3 are guided either directly or after having been reduced in pressure to the respective regulators 6,7, and the respective swash angles are controlled by the pressures so guided. In the second embodiment, on the other hand, the pilot secondary pressures P01,P02 are used as control pressures for the regulators 6,7. The first proportional solenoid valve 61 and second proportional solenoid valve 62 are driven by drive currents i1,i2 outputted from the controller 60. Except for these features, the second embodiment is equivalent to the above-described first embodiment.

In the hydraulic circuit of the second embodiment constructed as described above for the construction machine, the pressure signals P1,P2,P3 from the individual pressure sensors 53,64,65, a temperature signal TW from the coolant temperature sensor 66 and an air conditional drive signal SA are inputted to the controller 60, and based on these input signals, the controller 60 performs the processing illustrated in FIG. 7.

In this processing, the delivery pressures P1,P2,P3 of the respective hydraulic pumps 1,2,3 are firstly read in step S1, and based on the flow rate characteristics of the respective hydraulic pumps 1,2,3 as shown in FIG. 8 and FIG. 9, delivery flow rates Q1,Q2,Q3 are set corresponding to the respective delivery pressures P1,P2,P3 in the subsequent step S2. FIG. 8 illustrates the flow rate characteristics of the first and second hydraulic pumps 1,2 and, when the delivery pressure P3 of the third hydraulic pump 3 is not higher than a predetermined minimum pressure P3*m*, the delivery flow rate is set such that the maximum input torque does not exceeds a value indicated by a curve □ as shown in FIG. 8. When the delivery pressure P3 of the third hydraulic pump 3 is equal to or higher than a predetermined maximum pressure P30, the delivery flow rate is set such that the input torque does not exceed a value indicated by a curve n. When the delivery pressure P3 of the third hydraulic pump 3 is within a range of P3*m*<P3<P30, a delivery flow rate is set based on the value of the delivery pressure along input torque curves indicated by □ to i+1. When the delivery pressure P3 of the third hydraulic pump 3 is P3*i*+1 and the higher one of the delivery pressures P1,P2 of the first hydraulic pump 1 and second hydraulic pump 2 is Pa, for example, a delivery flow rate Qa on the input torque curve i+1 is set as a delivery flow rate of the first and second hydraulic pumps 1,2. As appreciated from the foregoing, the delivery flow rates of the first and second hydraulic pumps 1,2 are decreased depending upon the delivery pressure P3 from the third hydraulic pump 3, and are set such that, even when the delivery pressure P3 from the third hydraulic pump 3 increases beyond the predetermined maximum pressure P30, they are not decreased by a value greater than an input torque equivalent to the pressure P30.

On the other hand, FIG. 9 is a diagram illustrating the flow rate characteristics of the third hydraulic pump 3. Concerning the third hydraulic pump 3, the delivery flow rate is set depending solely upon the delivery pressure P3 of the third hydraulic pump 3 as shown in FIG. 9. Namely, when the delivery pressure P3 of the third hydraulic pump 3 is P3*n*', for example, a flow rate Qn' on the characteristic curve is set as the delivery flow rate of the third hydraulic pump 3.

Referring back to FIG. 8, a temperature signal TW from the coolant temperature detector 66 and a drive signal SA from the air conditioner drive switch 67 are read in the next step S3. If the coolant temperature TW is found in step S4 to be lower than a predetermined temperature TC, for example, a temperature TC which makes it possible to determine that the engine 5 has been brought into a state close to overheating, the routine advances to the next step S5 to determine whether or not driving of the air conditioner has been instructed. If the air conditioner is not found to be driven, the routine then advances to step S6.

If the coolant temperature TW is found to be equal to or higher than the predetermined temperature TC in the above-described step S4, the engine 5 is considered, for example, to be in a state close to overheating, and the routine then advances to step S9, in which the delivery flow rates Q1,Q2,Q3 of the respective hydraulic pumps 1,2,3 set in step S2 are multiplied by a coefficient á or â which is smaller than 1. Described specifically, Q1,Q2=Q1,Q2×á, Q3=Q3×â are performed so that the flow rates smaller than those set in step S2 are set. The flow rates are, therefore, reset such that torques consumed by the individual hydraulic pumps 1,2,3 become smaller. The routine then moves to step S6.

If the air conditioner is determined to be driven in step S5, the routine then advances to step S10 to decrease the load on the engine 5 by a load required to operate the air conditioner. Similarly to the above-described step S9, the delivery flow rates Q1,Q2,Q3 set in step S2 are multiplied by a coefficient á or â which is smaller than 1, and the routine then advances to step S6.

In step S6, output characteristics of the first proportional solenoid valve 61 and second proportional solenoid valve 62 are read. Described specifically, correlations between the input current i1,i2 and delivery pressures P01,P02 of the individual proportional solenoid valves 61,62 are read from unillustrated characteristics.

In the next step S7, output currents i1,i2 to the first proportional solenoid valve 61 and second proportional solenoid valve 62 are calculated based on the characteristics of the individual proportional solenoid valves 61,62, which have been read in step S6, to obtain the preset delivery flow rates Q1,Q2,Q3. As described above in connection with the first embodiment, the individual regulators 6,7 are arranged such that their swash angles are set in a wholesale manner depending upon the pressures P01,P02 applied to the swash angle control valves 6*b*,7*b* and the delivery flow rates Q1,Q2,Q3 are also determined in a wholesale manner depending upon the corresponding swash angles. In steps S6 and S7, the current values i1,i2 to the respective proportional solenoid valves 61,62 are calculated based on the pressures P01,P02 to the swash angle control valves 6*b*,7*b*, said pressures corresponding to the preset delivery flow rates Q1,Q2,Q3. In step S8, the current signals i1,i2 set in step S7 are outputted to the proportional solenoid valves 61,62.

When the current i1,i2 are fed to solenoids 61*a*,62*a* of the proportional solenoid valves 61,62, spools of the proportional solenoid valves 61,62 move in accordance with the values of these currents so that their valve positions change to IX side and XI side, respectively. By the movements of these spools, the pilot line 80 and the lines 81,82 are gradually brought into communication with each other so that the pilot secondary pressures P01,P02 are applied to the control drive portions 6*j*,7*h* of the swash angle control valves 6*b*,7*b*. By these pilot secondary pressures P01,P02, spools 6*g*,7*g* of the swash angle control valves 6*b*,7*b* are caused to move, and their valve positions move to I side and IV side, respectively. As a result, the large-diameter-side pressure receiving compartments 6*c*,7*c* of the servo cylinders 6*a*,7*a* and the pilot lines 28*a*,28*c* are brought into communication. Accordingly, the swash angles of the swash plates 1*a*,2*a*,3*a* are decreased, and the delivery flow rates from the individual hydraulic pumps 1,2,3 are controlled to the flow rates Q1,Q2,Q3 set in step S2 or step S9 or S10.

According to the second embodiment, the delivery flow rate Q3 of the third hydraulic pump 3 is designed to be controlled by its own delivery pressure P3 alone. Even when the load pressure on the boom cylinder 11, for example, varies and the delivery flow rates Q1,Q2 from the first and second hydraulic pumps 1,2 vary, in other words, even when the torques consumed by first and second hydraulic pumps 1,2 vary, a stable flow rate is assured.

Although the delivery flow rates Q1,Q2 of the first and second hydraulic pumps 1,2 are controlled depending upon their delivery pressures P1,P2 and the delivery pressure P3 from the third hydraulic pressure 3, the delivery flow rates Q1,Q2 are not decreased by a value greater than an input torque equivalent to the predetermined pressure P30 even when the delivery pressure P3 from the third hydraulic pump 3 becomes higher than the pressure P30. Therefore, the operating speeds of the boom cylinder 11 and arm cylinder 12, which are connected to the first and second hydraulic pumps 1,2, are not lowered excessively.

When the engine is determined to be in a state close to overheating based on the coolant temperature TW or when the air conditioner is driven, the delivery flow rates Q1,Q2, Q3 of the individual hydraulic pumps 1,2,3 are controlled low. The load on the engine 5 is, therefore, reduced correspondingly, thereby making it possible to avoid an engine stall.

THIRD EMBODIMENT

Figure 10:
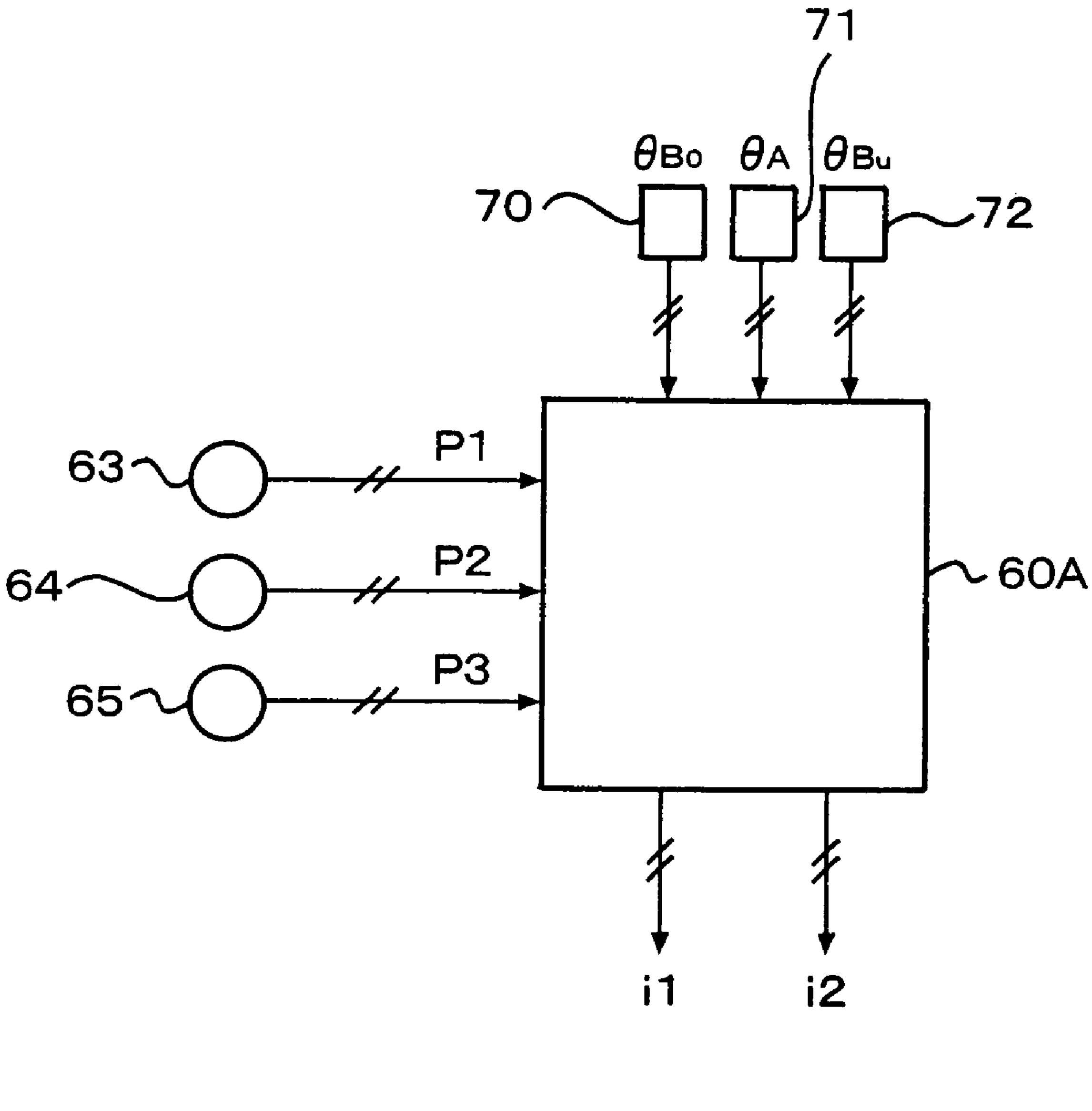
FIG. 10 is a diagram showing input-output correlations with respect to a controller in a third embodiment of the present invention.

Based on FIG. 10 and FIG. 11, a description will next be made about the third embodiment of the present invention. FIG. 10 is a diagram showing input-output correlations with respect to a controller 60A, and FIG. 11 is a map diagram for obtaining a correction coefficient upon performing processing at the controller 60A.

As shown in FIG. 10, the controller 60A in this third embodiment is inputted with delivery pressure signals P1,P2,P3 of the individual hydraulic pumps 1,2,3 and also with swing angle signals èB0,èA,èBU from the angle sensors 70,71,72 arranged on the boom 44, arm 45 and bucket 46, respectively, which make up the front members 47 of the hydraulic excavator illustrated in FIG. 5. The remaining construction is equivalent to the above-described second embodiment.

Figure 11:
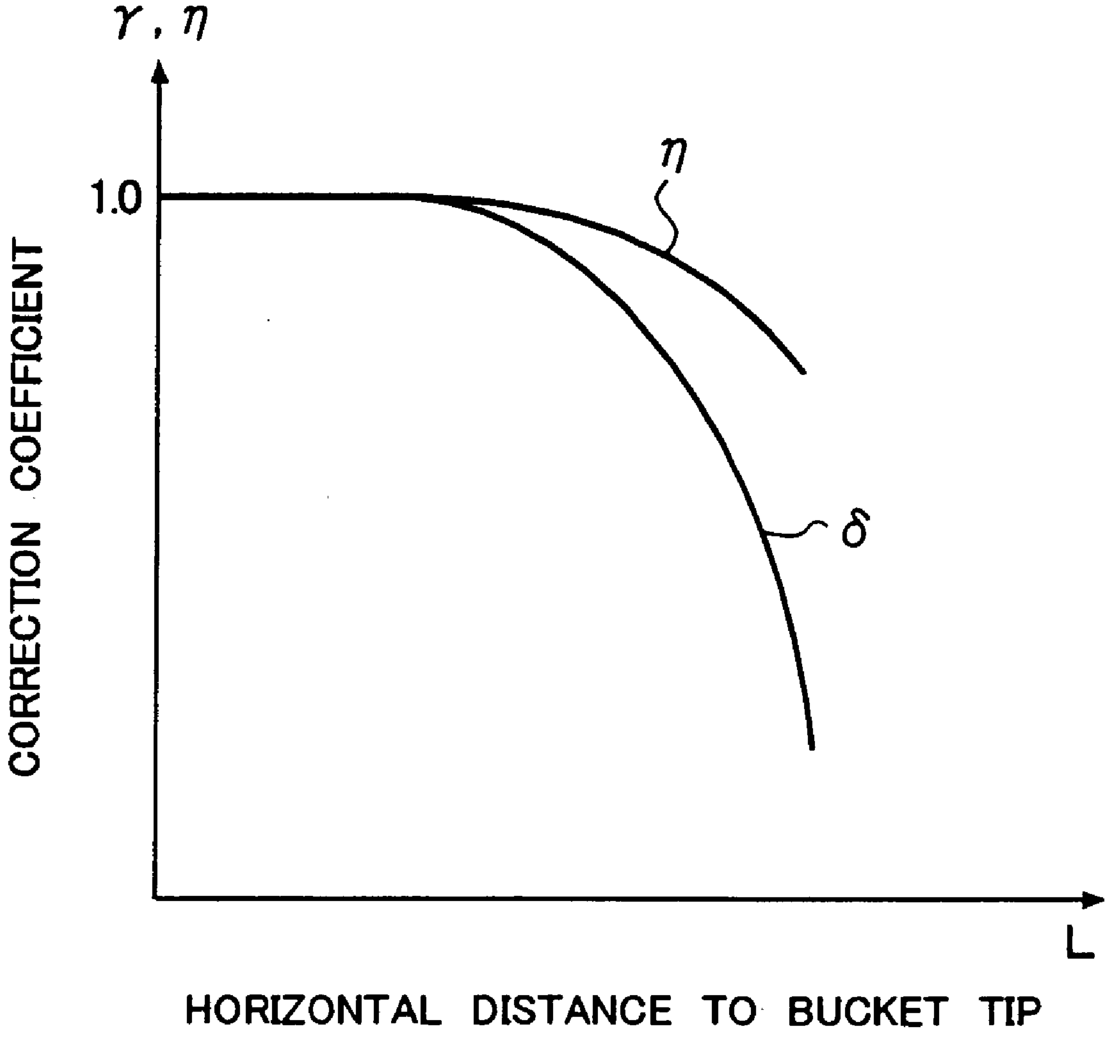
FIG. 11 is a diagram depicting a map for a correction coefficient in the third embodiment of the present invention.

According to the third embodiment constructed as described above, the controller 60A calculates a horizontal distance L from the revolving superstructure 40 to a tip of the bucket 45 on the basis of the individual swing angle signals èB0,èA,èBU, and then, a correction coefficient ç(≦1) for the delivery flow rates Q1,Q2 of the first and second hydraulic pumps 1,2 and a correction coefficient ã (≦1) for the delivery flow rate Q3 of the third hydraulic pump 3, said correction coefficients corresponding to the horizontal distance L, are obtained from the map shown in FIG. 11. Incidentally, these correction coefficients are set such that they take smaller values as the horizontal distance becomes greater. Like the above-described second embodiment, target delivery flow rates Q1,Q2,Q3 of the individual hydraulic pumps 1,2,3 are calculated based on the delivery pressures P1,P2,P3 from the individual hydraulic pumps 1,2,3. The thus-calculated delivery flow rates Q1,Q2 are multiplied by the above-mentioned correction coefficient ç, while the delivery flow rate Q3 is multiplied by the correction coefficient ã. As in the second embodiment described above, processing is then performed based on the target delivery flow rates Q1,Q2,Q3 corrected by the corresponding correction coefficients ã,ç, respectively, and current signals i1,i2 are hence outputted to the proportional solenoid valves 61,62.

Like the above-described first embodiment and second embodiment, even when the load on the boom cylinder 11 and/or the load on the arm cylinder 12 vary and hence, the torques consumed at the first and second hydraulic pumps 1,2 vary, the third embodiment makes it possible to avoid reflection of these variations to the swash angle control of the third hydraulic pump 3 so that the pressure oil is fed at a stable rate to the revolving motor 13 to assure smooth revolving operation. Even when the revolving load increases, the delivery flow rates from the first and second hydraulic pumps 1,2 are not decreased beyond necessity so that the boom cylinder 11 and arm cylinder 12 are each prevented from an extreme drop in speed and good operability is assured.

Even when a moment becomes larger due to the attitude of the front member 47 (the distance from the revolving superstructure 40 to the tip of the bucket 46), the delivery flow rates from the individual hydraulic pumps 1,2,3 can be controlled lower correspondingly. It is, therefore, possible to avoid an overload on the engine 5, and especially to reduce shocks which occur upon actuating and stopping the front member 47.

Figure 12:
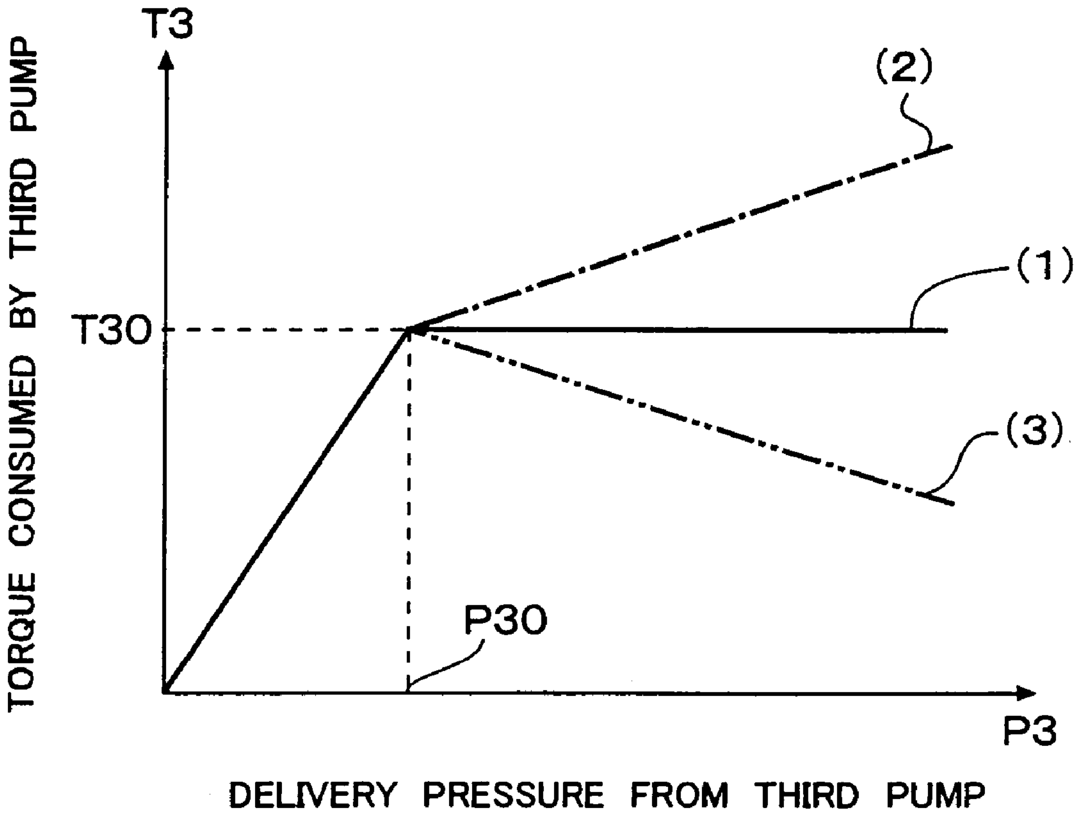
FIG. 12 is a diagram showing an example of setting of torque consumption by the third hydraulic pump in the present invention.
Figure 13:
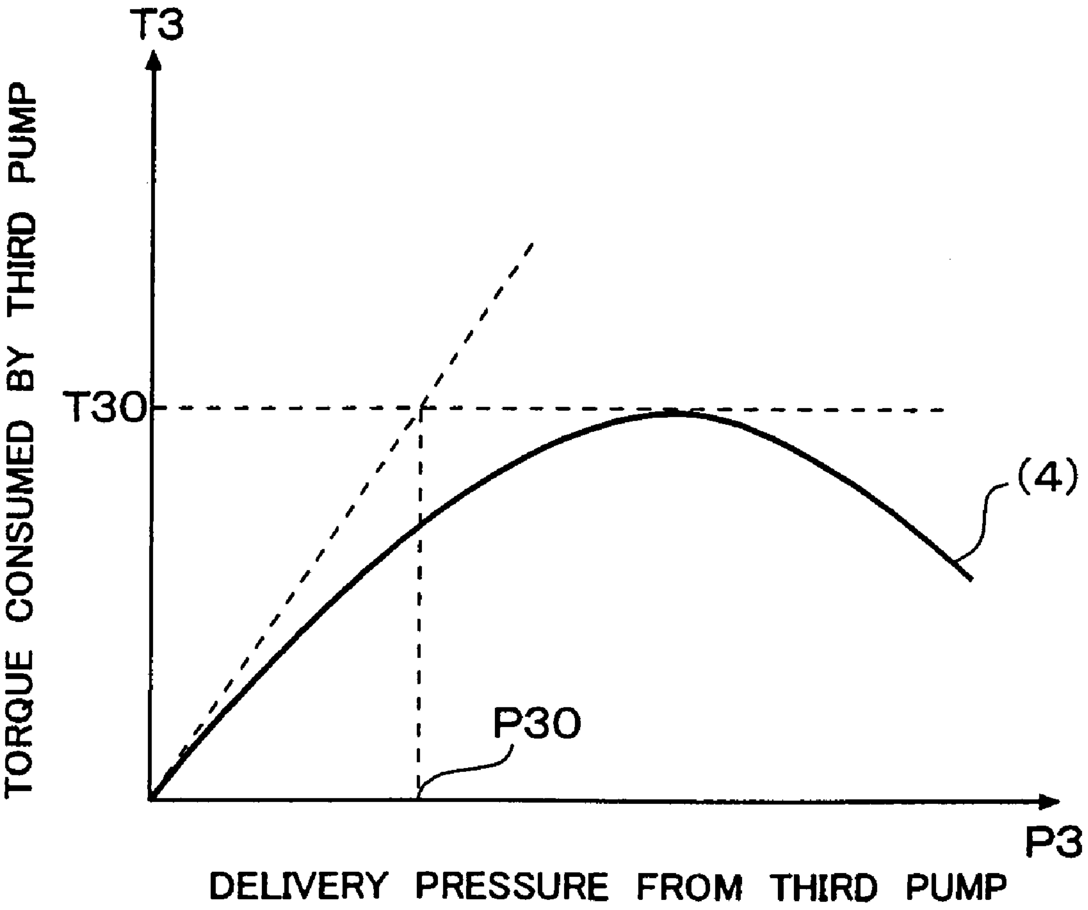
FIG. 13 is a diagram showing another example of the setting of torque consumption by the third hydraulic pump in the present invention.

In the above-described first, second and third embodiments, the flow characteristics of the third hydraulic pump 3 are set such that, as illustrated in FIG. 3 and FIG. 9, a constant maximum torque is reached in the area higher than the predetermined pressure P30. It is, however, possible to set, for example, such that the input torque increases or decreases in the area higher than P30 as indicated by an alternate long and short dash line (2) or an alternate long and two short dashes line (3) in FIG. 12, respectively. As a still further alternative, it is also possible to set such that the input torque decreases in a curved form as indicated by a curve (4) in FIG. 13.

Further, the swash plates 1*a*,2*a* of the first and second hydraulic pumps 1,2 are controlled by the common regulator 6. These hydraulic pumps 1,2 can be provided with independent regulators, respectively.

The regulators 6,7 in each of the embodiments were each described as being equipped with the flow rate control system for increasing or decreasing the swash angle(s) depending upon the flow rates required for the pumps as a result of operation of the actuators. Without arranging such flow rate control systems, however, they can be such regulators as achieving the maximum swash angles even when the actuators are not in operation.

As the control force to be applied to the regulator 6, the greater one of the delivery pressure P1 of the first hydraulic pump 1 and the delivery pressure P2 of the second hydraulic pump 2 was selected. However, an average of both pressures can be used.

The regulators 6,7 were constructed including the swash angle control valves 6*b*,7*b*. They can, however, be such regulators that by directly guiding control pressures to the servo cylinders 6*a*,7*a* and by applying predetermined pressing forces onto the opposite sides of the swash plates 1*a*,1*b*, the swash angles are controlled relying upon their balances.

As the maximum pressure acting on the regulator 6 for the first and second hydraulic pumps 1,2 on the basis of the delivery pressure P3 of the third hydraulic pump 3, the limit value P30 below which no flow control is performed on the third hydraulic pump 3 was used. The maximum pressure can, however, be slightly higher or lower than the limit value insofar as it is a value in the neighborhood of the limit value.

Further, the revolving motor 13 was exemplified as a particular actuator to be connected to the third hydraulic pump. Examples of such a particular actuator can include special attachments mounted in place of a bucket, such as a breaker and a secondary crusher.

INDUSTRIAL APPLICABILITY

As has been described above, even in a hydraulic circuit constructed such that three hydraulic pumps of the variable displacement type are used and the displacements of the individual hydraulic pumps are controlled by their delivery pressures, the present invention makes it possible to keep one of the hydraulic pumps unaffected by variations in the torques consumed by the remaining two hydraulic pumps and hence, to feed pressure oil at a stable flow rate to a specific actuator connected to the third hydraulic pump. Therefore, the driving of this specific actuator can be smoothly performed. Further, even when the load on the specific actuator connected to the third hydraulic pump increases, the delivery flow rates of the first and second hydraulic pumps do not decrease extremely. Accordingly, the actuators other than the specific actuator can each be protected from an excessive drop in speed so that good operability is assured.

The invention claimed is:

1. A hydraulic circuit for a construction machine, said hydraulic circuit having an engine, a first hydraulic pump of a variable displacement type, second hydraulic pump of the variable displacement type and third hydraulic pump, all of which are drivable by said engine, capacity control means for controlling displacements of said first hydraulic pump and second hydraulic pump, plural actuators drivable by pressure oil fed from said first, second and third hydraulic pumps, and plural directional control valves for controlling flows of pressure oil to be fed to said actuators, wherein one of said actuators, which is driven by pressure oil fed from said third hydraulic pump, is a specific actuator to which a larger load pressure is applied during driving thereof than those applied to remaining ones of said actuators, which are driven by said first and second hydraulic pumps, respectively, said third hydraulic pump is a hydraulic pump of the variable displacement type, said hydraulic circuit is provided with capacity control means for said third hydraulic pump to control a displacement of said third hydraulic pump and also with first, second and third state quantity detection means for detecting quantities of states associated with respective torque consumptions by said first, second and third hydraulic pumps, said capacity control means for said first and second hydraulic pumps controls displacements of said first and second hydraulic pumps on a basis of said quantities of states detected by said first, second and third state quantity detection means, said capacity control means for said third hydraulic pump controls a displacement of said third hydraulic pump on a basis of said quantity of state detected by said third state quantity detection means, and wherein said first and second hydraulic pumps are controlled under torque characteristics obtained by subtracting an input torque, which has been preset for said third hydraulic pump, from a maximum input torque to said first and second hydraulic pumps.

2. A hydraulic circuit for a construction machine, said hydraulic circuit having an engine, a first hydraulic pump of a variable displacement type, second hydraulic pump of the variable displacement type and third hydraulic pump, all of which are drivable by said engine, capacity control means for controlling displacements of said first hydraulic pump and second hydraulic pump, plural actuators drivable by pressure oil fed from said first, second and third hydraulic pumps, and plural directional control valves for controlling flows of pressure oil to be fed to said actuators, wherein one of said actuators, which is driven by pressure oil fed from said third hydraulic pump, is a specific actuator to which a larger load pressure is applied during driving thereof than those applied to remaining ones of said actuators, which are driven by said first and second hydraulic pumps, respectively, said third hydraulic pump is a hydraulic pump of the variable displacement type, said hydraulic circuit is provided with capacity control means for said third hydraulic pump to control a displacement of said third hydraulic pump and also with first, second and third state quantity detection means for detecting quantities of states associated with respective torque consumptions by said first, second and third hydraulic pumps, said capacity control means for said first and second hydraulic pumps controls disulacements of said first and second hydraulic pumps on a basis of said quantities of states detected by said first, second and third state quantity detection means, said capacity control means for said third hydraulic pump controls a disulacement of said third hydraulic pump on a basis of said quantity of state detected by said third state quantity detection means, said first state quantity detection means comprises a first guide line for guiding a delivery pressure from said first hydraulic pump to said capacity control means for said first and second hydraulic pumps, said second state quantity detection means comprises a second guide line for guiding a delivery pressure of said second hydraulic pump to said capacity control means for said first and second hydraulic pumps, said third state quantity detection means comprises a third guide line for guiding a deliyery pressure from said third hydraulic pump to said capacity control means for said first and second hydraulic pumps and a fourth guide line for guiding the delivery pressure from said third hydraulic pump to said capacity control means for said third hydraulic pump, wherein limiting means for applying a predetermined limit to a delivery pressure signal from said third hydraulic pump is arranged on said third guide line, wherein said limiting means is a reducing valve for limiting said delivery pressure signal to a pressure not higher than a predetermined setting pressure, and wherein said predetermined setting pressure for said limiting means is a delivery pressure from said third hydraulic pump when no control is performed on a delivery rate of said third hydraulic pump.

3. A hydraulic circuit for a construction machine, said hydraulic circuit having an engine, a first hydraulic pump of a variable displacement type, second hydraulic pump of the variable displacement type and third hydraulic pump, all of which are drivable by said engine, capacity control means for controlling displacements of said first hydraulic pump and second hydraulic pump, plural actuators drivable by pressure oil fed from said first, second and third hydraulic pumps, and plural directional control valves for controlling flows of pressure oil to be fed to said actuators, wherein one of said actuators, which is driven by pressure oil fed from said third hydraulic pump, is a specific actuator to which a larger load pressure is applied during driving thereof than those applied to remaining ones of said actuators, which are driven by said first and second hydraulic pumps, respectively, said third hydraulic pump is a hydraulic pump of the variable displacement type, said hydraulic circuit is provided with capacity control means for said third hydraulic pump to control a displacement of said third hydraulic pump and also with first, second and third state quantity detection means for detecting quantities of states associated with respective torque consumptions by said first, second and third hydraulic pumps, said capacity control means for said first and second hydraulic pumps controls displacements of said first and second hydraulic pumps on a basis of said quantities of states detected by said first, second and third state quantity detection means, said capacity control means for said third hydraulic pump controls a displacement of said third hydraulic pump on a basis of said quantity of state detected by said third state quantity detection means, said first state quantity detection means comprises a first guide line for guiding a delivery pressure from said first hydraulic pump to said capacity control means for said first and second hydraulic pumps, said second state quantity detection means comprises a second guide line for guiding a delivery pressure of said second hydraulic pump to said capacity control means for said first and second hydraulic pumps, said third state quantity detection means comprises a third guide line for guiding a delivery pressure from said third hydraulic pump to said capacity control means for said first and second hydraulic pumps and a fourth guide line for guiding the delivery pressure from said third hydraulic pump to said capacity control means for said third hydraulic pump, wherein limiting means for applying a predetermined limit to a delivery pressure signal from said third hydraulic pump is arranged on said third guide line, wherein said limiting means is a reducing valve for limiting said delivery pressure signal to a pressure not higher than a predetermined setting pressure, and wherein said predetermined setting pressure for said limiting means is a pressure corresponding to a value equal to a maximum input torque allotted to said third hydraulic pump.

4. A hydraulic circuit for a construction machine, said hydraulic circuit having an engine, a first hydraulic pump of a variable displacement type, second hydraulic pump of the variable displacement type and third hydraulic pump, all of which are drivable by said engine, capacity control means for controlling displacements of said first hydraulic pump and second hydraulic pump, plural actuators drivable by pressure oil fed from said first, second and third hydraulic pumps, and plural directional control valves for controlling flows of pressure oil to be fed to said actuators, wherein one of said actuators, which is driven by pressure oil fed from said third hydraulic pump, is a specific actuator to which a larger load pressure is applied during driving thereof than those applied to remaining ones of said actuators, which are driven by said first and second hydraulic pumps, respectively, said third hydraulic pump is a hydraulic pump of the variable displacement type, said hydraulic circuit is provided with capacity control means for said third hydraulic pump to control a displacement of said third hydraulic pump and also with first, second and third state quantity detection means for detecting quantities of states associated with respective torque consumptions by said first, second and third hydraulic pumps, said capacity control means for said first and second hydraulic pumps controls displacements of said first and second hydraulic pumps on a basis of said quantities of states detected by said first, second and third state quantity detection means, said capacity control means for said third hydraulic pump controls a displacement of said third hydraulic pump on a basis of said quantity of state detected by said third state quantity detection means, said first state quantity detection means comprises a first guide line for guiding a delivery pressure from said first hydraulic pump to said capacity control means for said first and second hydraulic pumps, said second state quantity detection means comprises a second guide line for guiding a delivery pressure of said second hydraulic pump to said capacity control means for said first and second hydraulic pumps, said third state quantity detection means comprises a third guide line for guiding a delivery pressure from said third hydraulic pump to said capacity control means for said first and second hydraulic pumps and a fourth guide line for guiding the delivery pressure from said third hydraulic pump to said capacity control means for said third hydraulic pump, wherein limiting means for applying a predetermined limit to a delivery pressure signal from said third hydraulic pump is arranged on said third guide line, wherein said limiting means is a reducing valve for limiting said delivery pressure signal to a pressure not higher than a predetermined setting pressure, and wherein said predetermined setting pressure for said limiting means is a pressure corresponding to a value slightly smaller than a maximum input torque allotted to said third hydraulic pump.

* * * * *